United States Patent [19]

Brende et al.

[11] Patent Number: 4,484,241
[45] Date of Patent: Nov. 20, 1984

[54] AUTOMATIC LOCK FOR HEAD-CARRIAGE ASSEMBLY IN A DISK FILE

[75] Inventors: Arthur P. Brende, Byron; Jerry L. Neubauer, Stewartville, both of Minn.

[73] Assignee: International Business Machines Corporation, Armonk, N.Y.

[21] Appl. No.: 378,970

[22] Filed: May 17, 1982

[51] Int. Cl.³ .................................................. G11B 5/54
[52] U.S. Cl. ...................................... 360/105; 360/137
[58] Field of Search ................................ 360/105–106, 360/109, 137, 86; 369/244, 257, 268

[56] References Cited

U.S. PATENT DOCUMENTS

| | | | |
|---|---|---|---|
| 3,518,651 | 6/1970 | Keeney | 360/75 |
| 4,139,874 | 2/1979 | Shiraishi | 360/86 |
| 4,188,648 | 2/1980 | Guerini | 360/137 X |
| 4,331,989 | 5/1982 | Viskochil | 360/97 |

*Primary Examiner*—John H. Wolff
*Attorney, Agent, or Firm*—Carl W. Laumann, Jr.

[57] ABSTRACT

A mechanical lock which serves to hold a transducer carriage in a fixed position at all times except when the storage disk is rotating at a speed sufficient to ensure that the transducers are flying at a height sufficient to avoid damage to the disk surface. The lock is disengaged by means of a solenoid and armature.

10 Claims, 5 Drawing Figures

AUTOMATIC LOCK FOR HEAD-CARRIAGE ASSEMBLY IN A DISK FILE

TECHNICAL FIELD

This invention relates to a mechanical lock for a carriage assembly in a disk type data storage device. The lock is particularly useful for preventing the heads from making contact with the disk in the region of the data tracks.

BACKGROUND ART

The surface of a disk used for the magnetic storage of data must be free of defects which could cause errors to occur. Great care is exercised in the manufacture of such disks to assure that defects do not exist or, if they do exist, that they are so small that they do not create errors in the recording or reproduction process. This is only part of the problem since defects can be created on the disk even after the manufacturing process is complete. A source of post manufacturing defects is the contact between the head and the disk which occurs when the disk is not rotating at a speed sufficient to cause the heads to fly.

In the prior art systems, the carriage assembly is usually fastened down to prevent motion during the period the unit is in transit between the manufacturing site and the customer's place of installation. The fastening devices used for this purpose involve screws or other elements which require human intervention. Once at the customer's site, the fastener is released and seldom used again because it is not the type of fastener or operation that the customer is likely to be familiar with.

The prior art disk files have tended to be rather large and expensive units. As a result, they were seldom moved once they were installed. However, disk drives have become progressively smaller and lighter. This has led to the situation where they are frequently moved about in the customer's office or computer room. It is this sort of movement, from one side of a room to another or out the door and down the hall, that causes the heads to ride back and forth across the disk in contact with the recording surface to create defects in the recording media. The mechanism by which defects are created includes gouging and scraping from particles in contact with both the head and the disk as well as the direct contact of the head with the disk surface.

The present invention allows the disk file to be conveniently moved by a person having no technical training without danger of having the recording heads slide in contact with the disk.

DISCLOSURE OF THE INVENTION

When the disk drive is in the inoperative state, that is, when the drive motor is not rotating, a spring actuated pin engages a hole in the carriage to prevent it from moving. When a signal is sent to the motor speed control indicating that the motor should be energized to begin rotation, a signal is also sent to a counter to reset it to zero. When the motor rotates it causes tachometer pulses to be sent to the motor speed control unit and to the counter. After a predetermined number of pulses, sufficient to allow the motor time to reach a safe speed, the counter emits an energize signal to a solenoid. When energized, the solenoid retracts the pin from the carriage and allows the carriage to move so that the desired data track can be energized.

DESCRIPTION OF THE INVENTION

Figure 1:
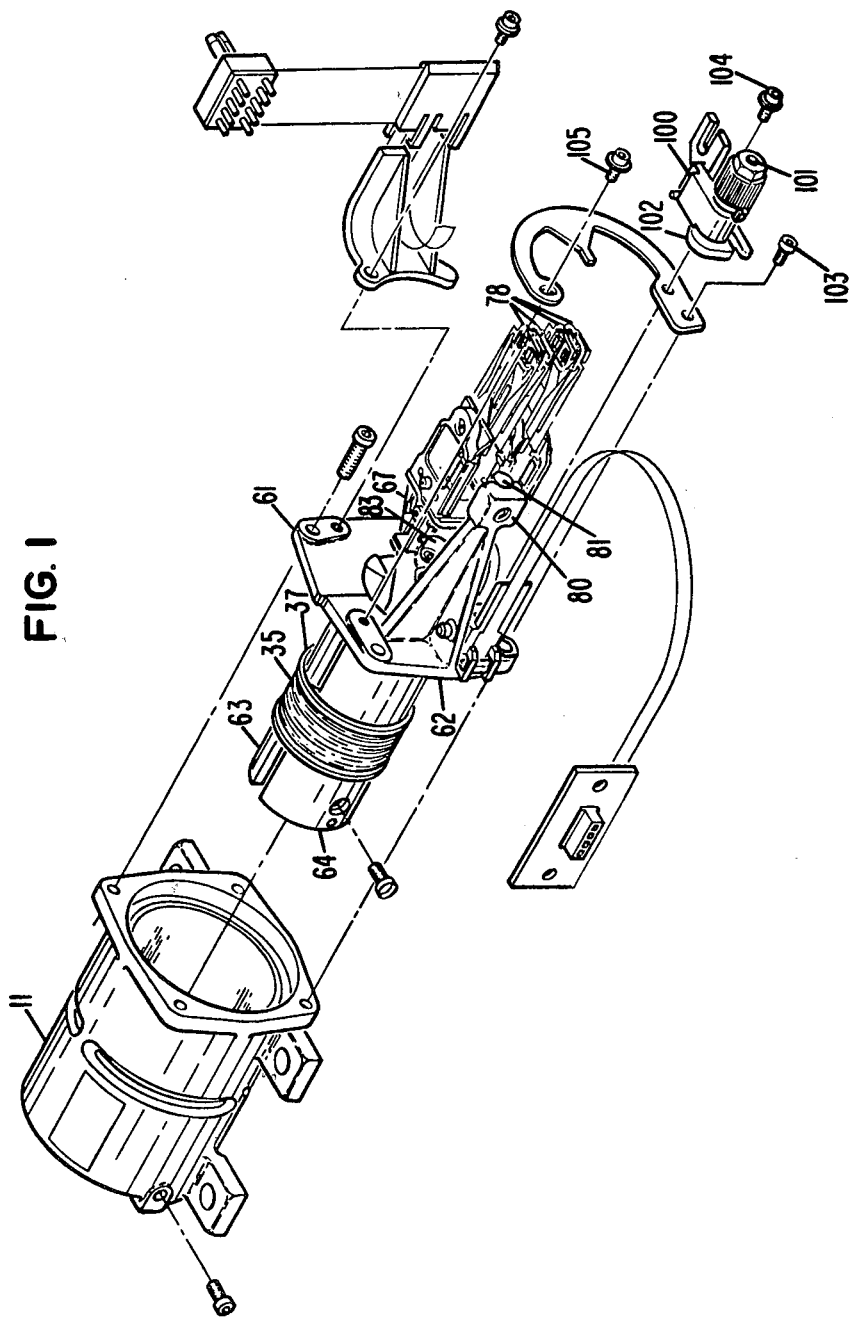
FIG. 1 is an exploded pictorial view of a voice coil type actuator with the carriage, head assembly, and carriage lock.

With reference to the drawings, and particularly to FIG. 1, the invention is shown in magnetic actuator of the linear motor type for use in a small disk file system. Aspects of the magnetic actuator not claimed in this application are described and claimed in co-pending application Ser. No. 340,169, filed Jan. 18, 1982 and assigned to the assignee of this application.

An outer frame 11 of magnetic material surrounds an inner core formed of two magnetically permeable frame parts 61 and 62. Cantilevered inner core parts 63 and 64 are integral parts of the frame parts 61 and 62 respectively. Cap screws which pass through the flange portion of frame parts 61 and 62 are used to secure these parts to the outer frame 11.

The drive coil 35 is wound on coil form 37 and disposed in the air gap between the inner core parts 61 and 62 and the radially polarized magnets disposed against the inner surface of outer frame 11 and not shown. The openings between inner core parts 63 and 64 accommodate webs which attach the movable drive coil 35 to the transducer carriage 67.

Movement of the transducer carriage is accommodated by means of roller bearings 83, one of which is visible. The bearings 83 ride against rod 81, which is fixed to cantilevered arm 80 which forms a part of the frame part 62. Other bearings, not shown in the drawing, support the other side of carriage 67.

A plurality of transducers 78 are mounted at the end of carriage 67 for coaction with a rotating disk or other rotating data storage media.

The automatic lock mechanism includes a rotatable pin support member 100 which is mounted on a threaded shaft 101 forming a part of the lock support plate 102. A pair of screws 103 and 104 hold support plate 102 to the frame part 62. A locking pin 105 projects upwardly so as to mate with a hole in the underside of carriage 67. The hole is located at a point on the carriage so that pin 105 matches the hole when the carriage is at the extreme outward position. When the carriage is at this position the transducers are over a portion of the rotating disk which is not used for the storage of data.

Figure 2:
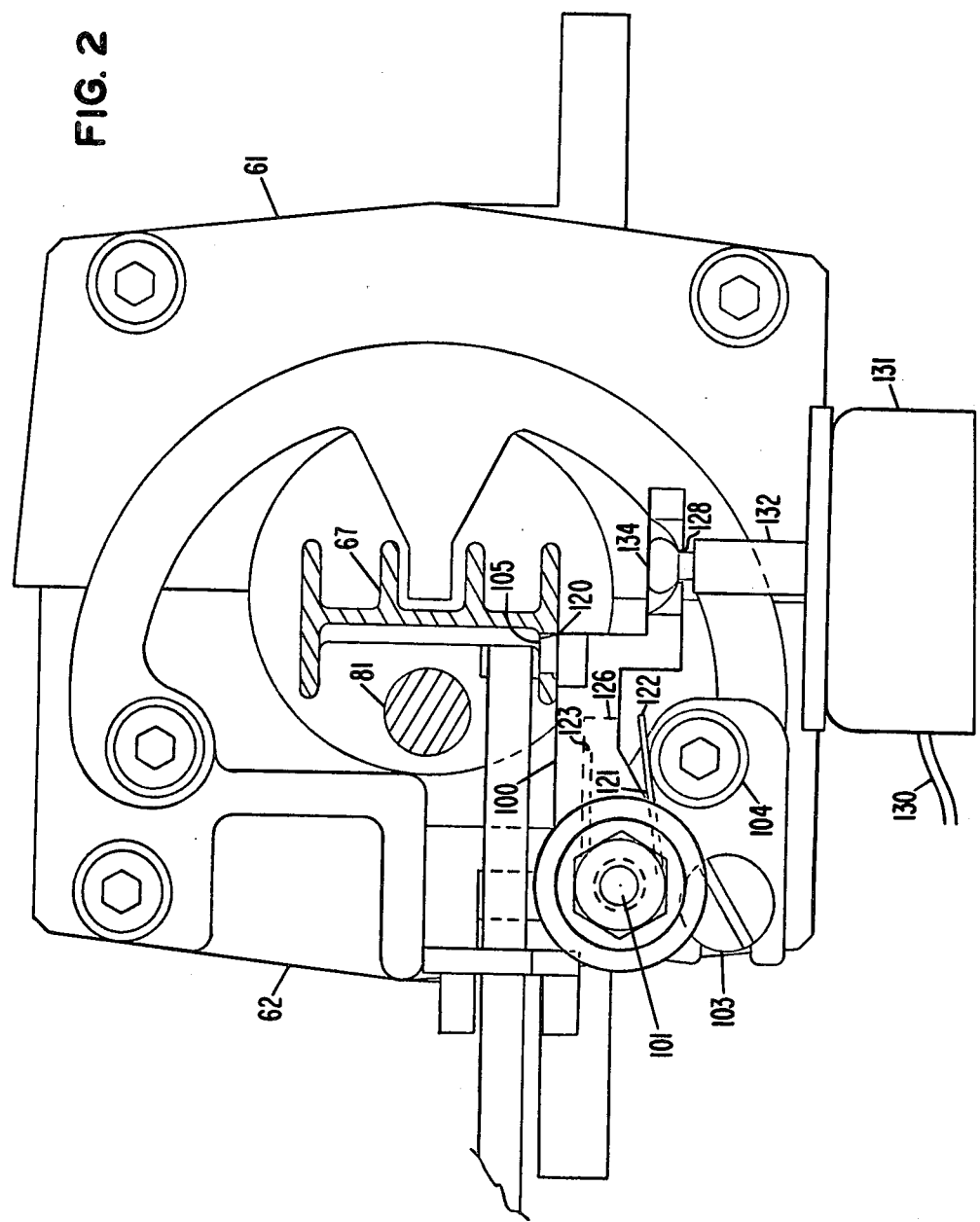
FIG. 2 is an end view, partially in section, of the actuator shown from the end which faces the disks.

In FIG. 2 the carriage 67 is shown in section with the section line at the point of the hole 120 which accommodates pin 105. Pin support member 100 is mounted on the shaft 101 to allow limited rotation toward and away from carriage 67. Spring 121, which wraps around shaft 101, has one end 122 which bears against mounting screw 104 and another end 123 which is retained in a recess 126 in support member 100. Spring 121 urges support member 100 upwardly in a counterclockwise direction. It has sufficient force to hold support member 100 and lock pin 105 against carriage 67 to hold carriage 67 in place even when pin 105 is not seated in hole 120.

When it is desired to move the carriage to access a desired track on the rotatable disk associated with the device, the coil 130 in solenoid 131 is energized to cause the armature 132 to move downward. The solenoid 132 has a ball shaped end portion 134 which is captured in a slot 128 in support member 100. When solenoid armature 132 moves downward in response to energization of coil 130 it causes support member 100 to rotate downwardly away from carriage 67. This rotation removes pin 105 from hole 120 and releases carriage 67 for movement. Solenoid 131 is maintained in the energized state for the entire period of operation.

Although it is not shown in the drawing it will be appreciated that the actuator and solenoid are fixed to a common frame which also supports the rotatable disk assembly.

Figure 3:
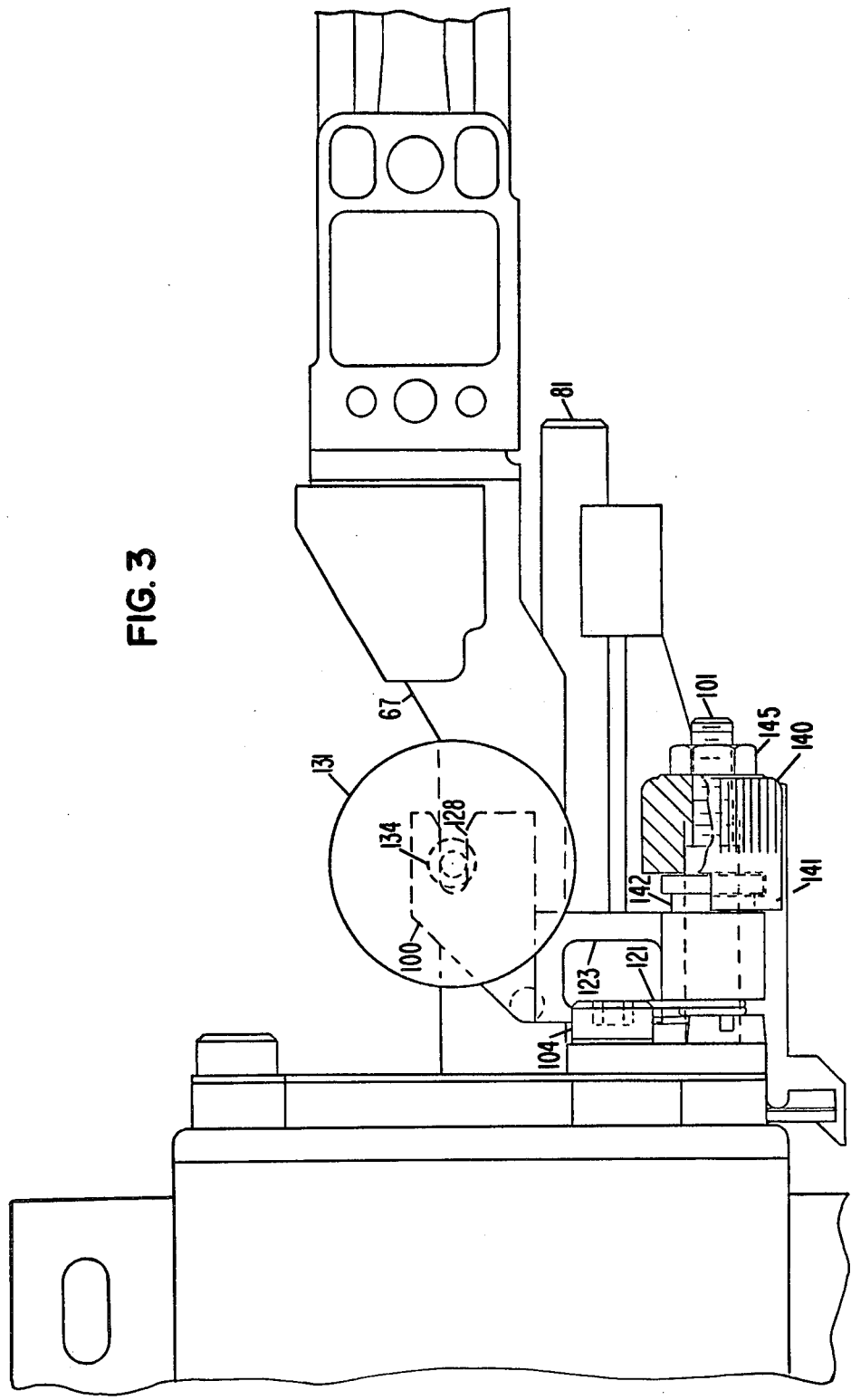
FIG. 3 is a bottom view of the portion of the actuator in the region of the mechanical lock.

FIG. 3 shows the lock structure from the bottom of the assembly. In this view, the shape of slot 128 is clearly shown. The shape of recess 123, which retains spring 121 is also seen from this view. Shaft 101 is threaded at the end to allow rotation of the knurled adjustment knob 140. When adjustment knob 140 is rotated, it moves along the threads on shaft 101. A collar portion 141 fits into a groove 142 in the pin support member 100, causing the support member to move along shaft 101 at the same time. The bore in support member 100 which accommodates shaft 101 is not threaded so support member 100 is free to follow the movement of adjustment knob 140.

The adjustment knob 140 allows the position of lock pin 105 to be very accurately located to exactly match the location of hole 120 when the carriage is in the extended position. This assures that the lock pin will enter the hole to provide a secure hold on carriage 67 instead of relying on simply the frictional engagement between the pin and the carriage. When adjustment of knob 140 is completed, a lock nut 145 is threaded on shaft 101 and tightened against knob 140 to secure it in place on the shaft.

Figure 4:
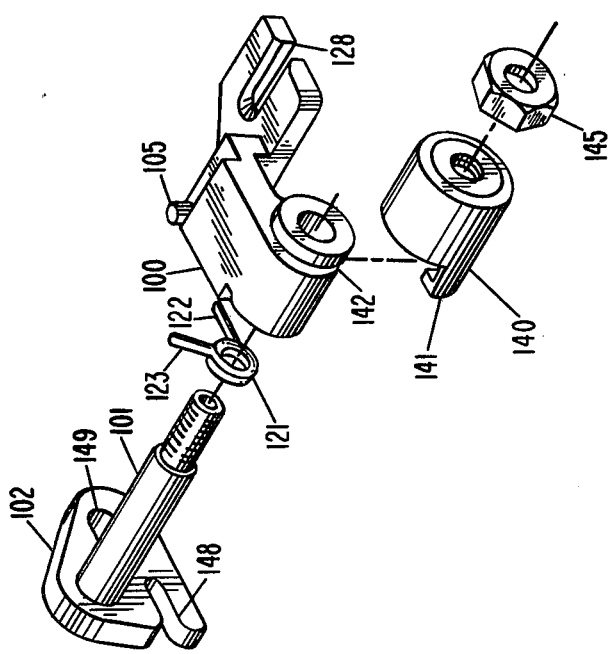
FIG. 4 is an exploded view of mechanical lock operated by the solenoid to engage the carriage.

FIG. 4 is an exploded view of the mechanical lock to better illustrate the interrelationship of the various parts. The unthreaded portion of shaft 101 is shown. Spring 121 is portrayed in the released condition. The shape of slot 128 is illustrated. The relationship between shoulder 141 on knob 140 and the slot 142 on pin support member 100 is evident. The open slot 148 and the slotted hole 149, which accommodate the mounting screws 103 and 104, are also shown.

Figure 5:
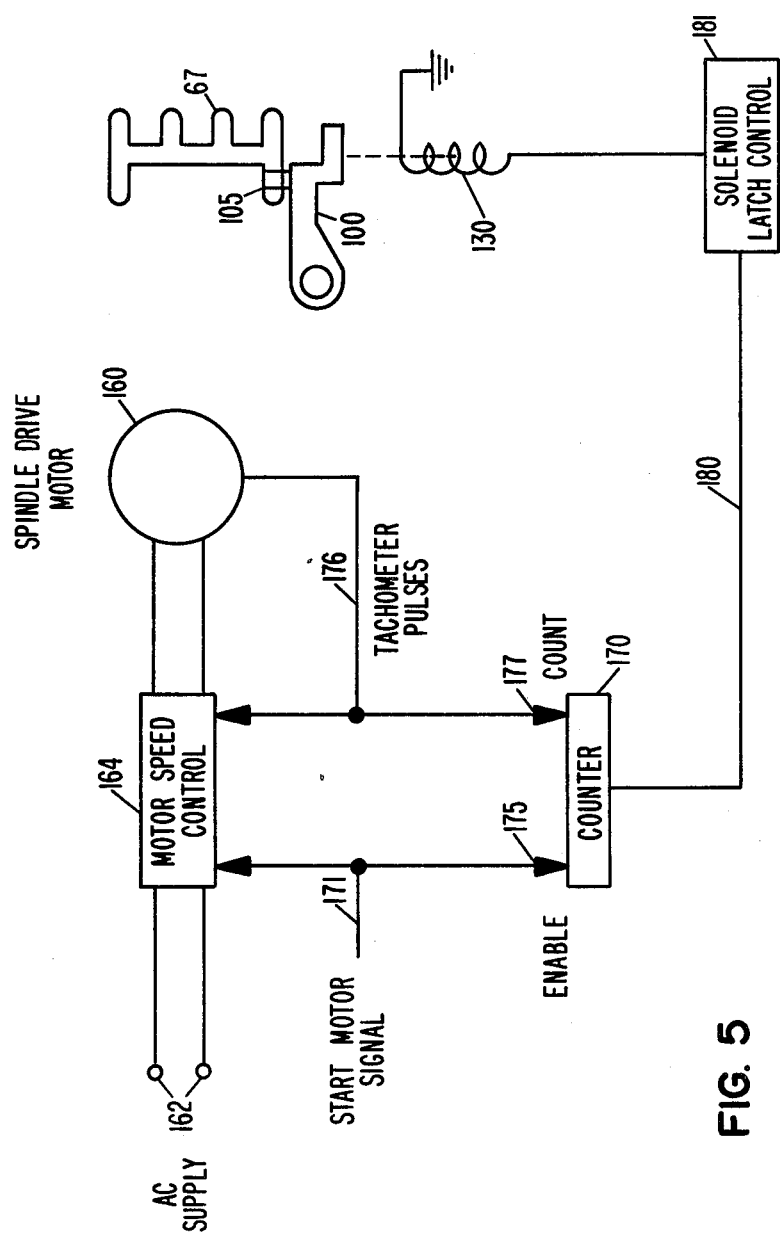
FIG. 5 is a schematic drawing of the electronic system used to control the lock.

The electronic control system for the lock is shown in FIG. 5. The disk spindle drive motor 160 is connected to the A.C. supply terminals 162 through motor speed control 164. The motor speed control 164 is a conventional speed regulator and forms no part of this invention. It is effective to regulate the rotational velocity of the storage disk to a desired value. It accomplishes this result by means of feedback tachometer pulses derived from the motor. A start motor signal is also fed to the motor speed control 164. This signal is effective to start the motor from the rest condition. It will be noted that the start motor signal and the tachometer pulses are also applied to counter 170. The start motor signal on line 171 is connected to the enable input 175 of counter 170. The tachometer pulses on line 176 are applied to the count input 177 of counter 170. When the count value in counter 170 reaches a predetermined value a safe speed signal is generated on line 180. The line 180 is connected to solenoid latch control 181. When the safe speed signal appears on line 180, the solenoid latch control 181 causes the solenoid winding 130 to be energized. As described earlier, energization of solenoid winding 130 causes armature 132 to move downward and rotate support member 100 downward, removing pin 105 from the hole in carriage 67 to free it for movement.

The safe speed signal on line 180 appears after a predetermined number of tachometer pulses have been generated. The number is selected to assure sufficient time for acceleration of the motor and disk to a velocity which allows the heads to fly rather than rub against the surface of the disk. In a typical embodiment this will be approximately 3000 rpm.

While the invention has been particularly shown and described with reference to a preferred embodiment thereof, it will be understood by those skilled in the art that various changes in form and details may be made therein without departing from the spirit and scope of the invention.

What is claimed is:

1. In an actuator having a frame and a transducer carriage for positioning a transducer with respect to a recording media, a lock mechanism for holding said carriage in a fixed position relative to said frame, comprising:

a pin member fixed to said frame and movable from a first position engaging said carriage to restrain movement thereof to a second position clear of said carriage to allow movement thereof, spring means biasing said pin member toward said first position, solenoid means having a magnetic coil and an armature means mechanically coupled to said pin member, means for energizing said solenoid in response to a signal indicating a predetermined velocity of said media relative to said transducer to move said pin member from said first position to said second position.

2. In an actuator having a frame and a transducer carriage for positioning a transducer with respect to a recording media, a lock mechanism for holding said carriage in a fixed position relative to said frame, comprising;

a support member mounted on a shaft fixed to said frame, a lock pin affixed to said support member, said support member being movable between a first position wherein said lock pin engages said carriage and a second position wherein said lock pin is clear of said carriage, spring means biasing said support member toward said first position, solenoid means having a magnetic coil and an armature means mechanically coupled to said pin support member, means for energizing said solenoid including, counter means for generating an output signal in response to a predetermined count, means for enabling said counter in response to a start motor signal, means for applying, to said counter, pulses derived in response to motion of said recording media, solenoid control means for applying current to said solenoid in response to an output signal from said counter, said armature means being operative to move said support member from said first position to said second position when said solenoid is energized, thereby releasing said carriage for movement.

3. A device according to claim 2 wherein;
said fixed position of said carriage locates a transducer over a portion of the recording media which is not used for data.

4. A device according to claim 3 wherein;
said recording media is a magnetic disk.

5. A device according to claim 2 wherein;
said output signal from said counter is representative of a relative velocity between said transducer and said media greater than the minimum for safe operation of said transducer in the region of recorded data.

6. A device according to claim 3 wherein;
said output signal from said counter is representative of a rotational velocity of said disk which is sufficient to make said transducer fly at a safe distance from said disk.

7. A device according to claim 2 wherein,
said shaft has a threaded adjustment knob on the end thereof opposite said frame for positioning said support member along the axis of said shaft.

8. A device according to claim 2 wherein;
said carriage contains a hole for accommodation of said lock pin at a position opposite said lock pin when said carriage is in the fully extended position.

9. A device according to claim 6 wherein;
said carriage contains a hole for accommodation of said lock pin at a position in alignment with said lock pin when said carriage is in the fully extended position.

10. In a storage device having a rotatable storage media with a plurality of data tracks, an actuator having a frame and a transducer carriage for positioning a transducer to coact with a desired data track,
a lock mechanism for holding said carriage in a fixed position relative to said frame, comprising:
a pin support member fixed to said frame and movable from a first position engaging said carriage to restrain movement thereof to a second position clear of said carriage to allow movement thereof,
spring means biasing said pin support member toward said first position,
solenoid means having a magnetic coil and an armature means mechanically coupled to said pin support member,
means for energizing said solenoid in response to a signal indicating a predetermined safe rotational velocity of said media relative to said transducer to move said pin support member from said first position to said second position thereby allowing said carriage to move relative to said data tracks.

* * * * *